United States Patent [19]
Skinner et al.

[11] Patent Number: 5,577,025
[45] Date of Patent: Nov. 19, 1996

[54] SIGNAL ACQUISITION IN A MULTI-USER COMMUNICATION SYSTEM USING MULTIPLE WALSH CHANNELS

[75] Inventors: Gordon Skinner, deceased, late of Boulder, Colo., by Margo Boodakian, legal representative; Brian Harms, Superior, Colo.

[73] Assignee: Qualcomm Incorporated, San Diego, Calif.

[21] Appl. No.: 497,240

[22] Filed: Jun. 30, 1995

[51] Int. Cl.$^6$ .............................. H04J 13/02; H04J 3/06
[52] U.S. Cl. .......................... 370/22; 370/98; 370/100.1; 375/200; 375/354
[58] Field of Search .................................. 370/18, 19, 20, 370/21, 22, 100.1, 107, 74, 98; 375/200, 205, 206, 208, 354, 359; 379/58, 59; 455/31.1, 33.1, 38.1, 53.1, 54.1

[56] References Cited

U.S. PATENT DOCUMENTS

| | | | |
|---|---|---|---|
| 4,567,588 | 1/1986 | Jerrim | 370/18 |
| 4,621,365 | 11/1986 | Chiu | 375/200 |
| 4,653,076 | 3/1987 | Jerrim et al. | 370/18 |
| 5,490,165 | 2/1996 | Blakeney et al. | 375/205 |

*Primary Examiner*—Hassan Kizou
*Attorney, Agent, or Firm*—Russell B. Miller; Gregory D. Ogrod

[57] ABSTRACT

A technique for using energy received by subscriber units over multiple orthogonal channels within a spread spectrum communication system to acquire signal timing by controlling signal amplitude integration intervals used in detecting such timing. Received signals are despread and respective amplitudes integrated over periods that are divisible by factors of 2 into the length of Walsh functions used to generate orthogonal signal channels. Non-coherent combinations of the results of this integration are subsequently formed over periods that commence and terminate on Walsh function boundaries, and used to determine when a correct time offset has been selected for despreading signals. Additional advantages are realized by assigning signals that consistently provide a higher energy content such as paging, synchronization, and most frequently assigned traffic channels to specific orthogonal channels within the communication system. In exemplary embodiments, Walsh functions of length 128 are used as channelizing codes and a pilot signal is assigned to channel 0. This results in traffic channels or paging and synchronization functions being assigned to channel 64 when the integration periods are 64 chips long, and to channels 32, 64, and 96 when the periods are 32 chips long. In this manner, additional energy is available during the integration process for use in determining when correct signal acquisition timing offsets have been selected, without the use of additional hardware.

23 Claims, 5 Drawing Sheets

SIGNAL ACQUISITION IN A MULTI-USER COMMUNICATION SYSTEM USING MULTIPLE WALSH CHANNELS

BACKGROUND OF THE INVENTION

1. Field of the Invention

The present invention relates to multiple access communication systems, such as wireless data or telephone systems, and satellite repeater type spread spectrum communication systems. More particularly, the invention relates to a method and apparatus for acquiring and tracking digital signals being transmitted within a communication system using energy from multiple Walsh function encoded channels. The invention further relates to a method of acquiring pilot signals in code division multiple access spread spectrum type communication systems.

2. Description of the Related Art

A variety of multiple access communication systems have been developed for transferring information among a large number of system users. Two known techniques employed by such multiple access communication systems include time division multiple access (TDMA) and frequency division multiple access (FDMA), the basics of which are well known in the art. However, spread spectrum modulation techniques, such as code division multiple access (CDMA) spread spectrum techniques, provide significant advantages over the other modulation schemes, especially when providing service for a large number of communication system users. The use of CDMA techniques in a multiple access communication system is disclosed in the teachings of U.S. Pat. No. 4,901,307, which issued Feb. 13, 1990 under the title "*Spread Spectrum Multiple Access Communication System Using Satellite Or Terrestrial Repeaters*", and U.S. patent application Ser. No. 08/368,570, filed under the title "*Method And Apparatus For Using Full Spectrum Transmitted Power In A Spread Spectrum Communication System For Tracking Individual Recipient Phase Time And Energy*," which are both assigned to the assignee of the present invention, and incorporated herein by reference.

These patents disclose multiple access communication systems in which a large number of generally mobile or remote system users or subscribers each employ at least one transceiver to communicate with other system users or desired signal recipients, such as through a public telephone switching network. The transceivers communicate through gateways and satellite repeaters, or terrestrial base stations (also sometimes referred to as cell-sites or cells) using code division multiple access (CDMA) spread spectrum type communication signals. Base stations cover cells which are defined by the effective 'reach' of their signals, while satellites form beams which cover a 'spot' produced by projecting satellite communication signals onto the Earth's surface. In addition, cells are generally divided into different geographical regions referred to as sectors, while satellite beams at different frequencies, sometimes referred to as FDMA signals, beams, or sub-beams, may cover a common geographical region. The geographic regions serviced are similar in nature differing in the physical characteristics of the type of repeater platform used and its location. Although, certain characteristics of the transmission paths and restraints on frequency and channel reuse may also differ between these platforms.

In CDMA communication systems, a set or pair of preselected pseudorandom noise (PN) code sequences are used to modulate or 'spread' user information signals prior to modulation onto a carrier signal for transmission as communication signals. In the base station- or gateway-to-subscriber communication link, PN spreading codes or binary sequences are used to discriminate between signals transmitted by different base stations or over different beams from gateways, as well as between multipath signals. These codes are typically shared by all communication signals within a cell or beam. Channelizing codes are used to discriminate between different users within a cell or between user signals transmitted within a satellite beam on a forward link. That is, each subscriber unit has its own orthogonal channel provided on the forward link by using a unique 'covering' orthogonal code. Walsh functions are generally used to implement the channelizing codes, with a typical length being on the order of 64 code chips for terrestrial systems and 128 code chips for satellite systems. In this arrangement, each Walsh function of 64 or 128 chips is typically referred to as a Walsh symbol.

In addition, some signal diversity is used as one approach to reduce the deleterious effects of fading and additional problems associated with relative user, or satellite repeater, movement within the communication system. Generally, three types of diversity are used in spread spectrum communication systems, and they are time, frequency, and space diversity. Time diversity is obtainable using repetition and time interleaving of signal components. A form of frequency diversity is inherently provided by spreading the signal energy over a wide bandwidth. Therefore, frequency selective fading affects only a small part of the CDMA signal bandwidth. Space diversity is provided using multiple signal paths, typically, through different antennas or communication signal beams.

Typical CDMA spread spectrum communication systems, such as disclosed in U.S. Pat. No. 4,901,307, contemplate the use of coherent modulation and demodulation for forward link subscriber unit communications. In communication systems using this approach, a 'pilot' carrier signal is used as a coherent phase reference for gateway- or satellite-to-user and base station-to-user links. That is, a pilot signal, which typically contains no data modulation, is transmitted by a base station or gateway throughout a region of coverage. A single pilot is typically transmitted by each gateway or base station for each frequency used. This pilot is shared by all users receiving signals from that source. Generally, sectors each have their own distinct pilot signals while satellite systems transfer a pilot within each satellite beam frequency, or sub-beam, which originates with gateways using the satellite.

Since pilot signals do not typically involve data modulation, they essentially consist of PN spreading codes which are modulated onto a carrier frequency. Pilot signals use the same PN spreading code or set of codes throughout the communication system but with different relative code timing offsets for each beam, cell, or sector. This provides signals that can be readily distinguished from each other, also distinguishing between beams and cells while providing simplified acquisition and tracking. Other signals are used to transmit spread spectrum modulated information, such as gateway or base station identification, system timing, user paging information, and various other control signals.

Pilot signals are used by subscriber units to obtain initial system synchronization, and time, frequency, and phase tracking of transmitted signals. Phase information obtained from tracking a pilot signal carrier is used as a carrier phase reference for coherent demodulation of other system or user information signals. This technique allows many user signal carriers to share a common pilot signal as a phase reference, providing for a less costly and more efficient tracking mechanism.

As part of the process of establishing a communication link, the subscriber unit transceiver employs a receiver referred to as a 'searcher receiver', or simply 'searcher', to track the frequency of the pilot and obtain synchronization with the pilot timing. Several techniques and devices have been used to provide this searcher function. One such technique is disclosed in U.S. Pat. No. 5,109,390 entitled "*Diversity Receiver In A CDMA Cellular Telephone System,*" issued Apr. 28, 1992, which is assigned to the assignee of the present invention, and incorporated herein by reference.

To actually acquire a pilot signal, the searcher receiver despreads pilot signals using a correlator with system PN codes generated in the subscriber unit using local reference timing. After this despreading, signal amplitudes are measured for received signal chips and accumulated over a preselected interval of time. This provides a coherent sum of chip amplitudes. A number of such accumulated values are squared and then further summed (both I and Q) to produce a non-coherent sum which is compared to one or more predetermined threshold levels. Non-coherent sums exceeding desired thresholds generally indicate that appropriate pilot signal timing has been selected.

One problem that occurs during the accumulation process is that certain Walsh functions useful for generating individual orthogonal communication channels for subscriber units, tend to interfere both constructively and destructively with each other under certain conditions. For example, when using a set of 128 Walsh functions of length 128, functions 0 and 64 tend to cause constructive or destructive interference when signal amplitudes are accumulated over intervals that are less than or equal to one-half of the Walsh function length. This interference associated with short accumulations tends to increase the likelihood of false alarms (deciding the current timing hypothesis is correct when it's not) and misses (deciding the current timing hypothesis is wrong when it's actually correct).

This interference is exhibited for more Walsh functions or communication channels the shorter the accumulation interval becomes, such as one-half versus one-quarter versus one-eighth of a function length. However, it is unacceptable to simply increase the length of the integration time to compensate. This is complicated by the fact that future communication systems may use multiple PN codes and other features or changes in signal parameters that also require search space. That is, the searcher may be searching across other parameters besides Doppler frequency and PN timing, and each parameter increases the length of a search by a factor of two or more. Therefore, time is at a premium for each search factor or parameter.

Therefore, it is desirable to have a method and apparatus for signal acquisition that provides faster and more reliable signal acquisition when using integration or accumulation windows that are less than or equal to one-half of the channel forming function length. It is also desirable to make more efficient use of signal energy, or more appropriately distribute higher use or power signals among the various orthogonal channels in a communication system to provide improved energy capture and signal acquisition.

SUMMARY OF THE INVENTION

In view of the above and other problems found in the art relative to pilot channel signal acquisition and signal demodulation in multiple access communication systems, one purpose of the present invention is to provide improved signal acquisition in terms of speed and more efficient threshold comparisons.

An advantage of the invention is that it uses energy more efficiently to establish correct signal timing hypotheses.

Another advantage of the invention is that it allows more effective use of short signal accumulation periods.

Another purpose of the invention is to more effectively use the energy available in non-pilot signals to improve signal acquisition.

Yet another advantage of the invention is that due to certain relative code alignments, data modulation and PN modulation referred to as outer PN modulation are both transparent to the searcher function.

These and other purposes, objects, and advantages are realized in a method and apparatus for acquiring timing synchronization with Walsh channel signals in a spread spectrum communication system in which one or more communication signals are received and demodulated by system subscribers. The communication signals are generated by first encoding a series of subscriber data signals using one of a preselected set of Walsh functions for each communication channel. The channelized signals are then spread using common PN code sequences, generally as a pair for I and Q channels, which are applied at one of a plurality of timing offsets. The spread signals are then modulated onto a common carrier frequency. Communication signals received by subscriber units are converted to digital form and then despread by applying the PN code sequence at a preselected timing offset chosen locally by each subscriber unit.

The amplitudes of resulting channel symbols are integrated over a predetermined time interval equivalent to the length L of the Walsh functions divided by a factor of $2^n$. This is typically implemented by using an accumulation element to collect and sum a series of symbol amplitudes. The resulting sums are squared using squaring or multiplication elements to provide a coherent sum, and then accumulated over an interval commencing and ending at Walsh code boundaries to provide a non-coherent combination of sums. The final sum is related to the net energy received in correlated or despread communication signals, and changes substantially in value depending whether or not the selected PN code time offset for a subscriber unit corresponds to that of a signal to be acquired.

The final non-coherent combination sum is compared to a threshold value from one or more threshold values used to establish a minimum energy level for determining proper timing alignment or signal correlation. When the final sum exceeds a desired threshold, the timing offset used for despreading is selected as a desired value to be used in tracking the timing of, and demodulating, the orthogonal channel signal. If the final sum does not exceed desired thresholds, a new timing offset is selected and the accumulation and threshold comparison processes are restarted.

This technique provides a larger amount of energy for subscribers to use in acquiring the timing of pilot or other desired signals. This energy is especially useful when the received pilot signal power is less than optimum for a particular subscriber unit trying to acquire the pilot signal. That is, the pilot signal transmission power is lower than desired for high speed signal acquisition, or signal degradation has decreased received power.

This signal acquisition process is further improved by setting the coherent accumulation or integration period to a value of $L/2^n$ and then assigning a pilot signal to a first channel and traffic signals with a consistent minimum amount of energy preferentially to channels that are spaced apart from the first channel by increments of $sL/2^n$, where n is a positive integer and s equals 1 through $2^n-1$ (1, 3, 7, . . . ). When there are 128 channels, this results in using channels 32, 64, and 96 for traffic when a pilot is assigned to channel 0, and using channels 33, 65, and 97 when the pilot is assigned to channel 1. Other channels or Walsh functions can clearly be used for a pilot signal if desired within a given communication system, and this relationship extends to any such pilot channel, over the total length of the functions being used. Alternatively, each of these channels is assigned for use as paging and synchronization channels, which assures a consistently higher amount of energy for use in signal acquisition.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein.

DETAILED DESCRIPTION OF PREFERRED EMBODIMENTS

Figure 1:
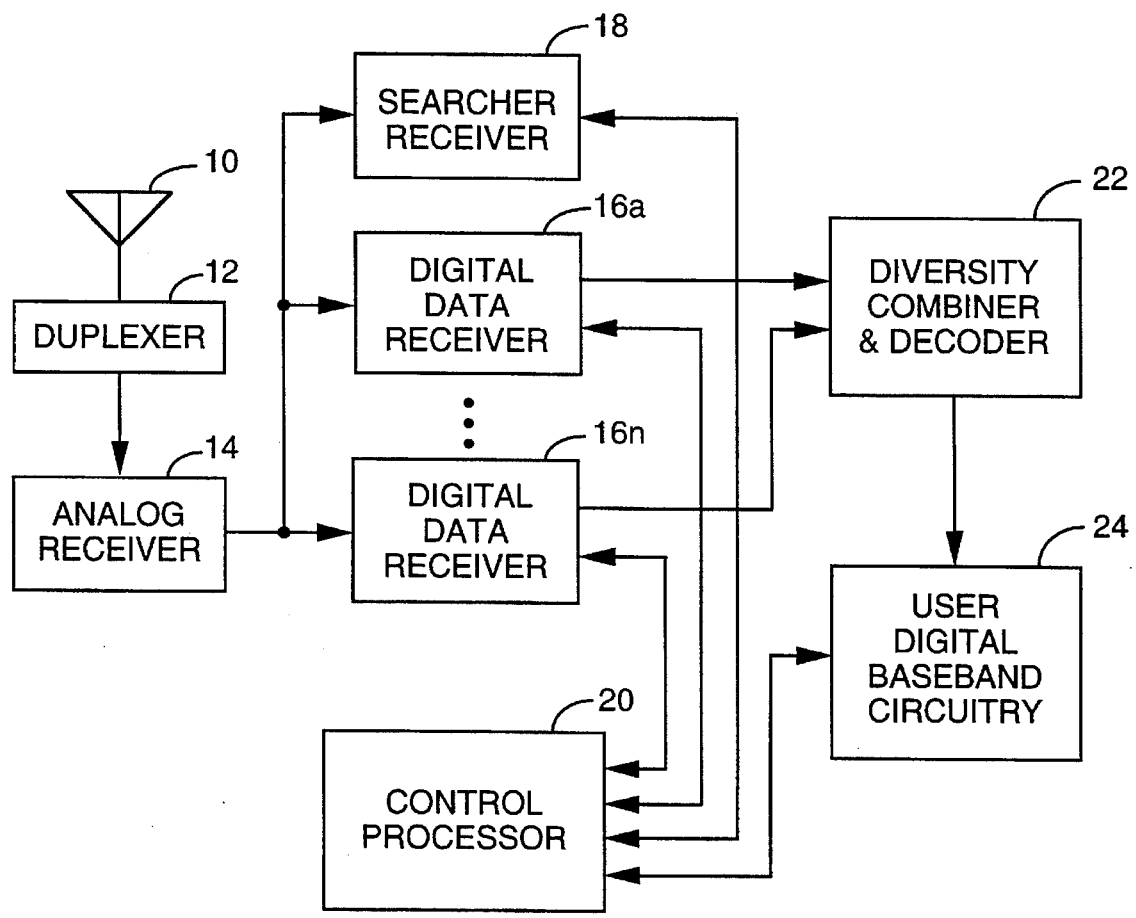
FIG. 1 illustrates exemplary subscriber unit demodulation apparatus for a wireless communication system.

The present invention provides a technique for using energy received by subscriber units over multiple orthogonal channels within a spread spectrum communication system to acquire CDMA timing. This is partially accomplished by constraining signal amplitude accumulation intervals used in detecting signal timing. Received signals are despread and their respective amplitudes are accumulated over periods that are both integer powers of two and divisors of L, the length of orthogonal codes used to generate orthogonal signal channels in the system. Non-coherent combinations of the results of this integration are subsequently formed over periods that commence and terminate on Walsh function boundaries. These combinations are then used to determine when a correct time offset has been selected for PN codes used in despreading signals. Additional advantages are realized by assigning signals that consistently provide a higher energy content such as paging, synchronization, and most frequently assigned traffic channels to specific orthogonal channels within the communication system.

For example, using Walsh functions of length 128 in a communication system as channelizing codes and a pilot signal assigned to channel 0, consistent traffic, paging, or synchronization channel signals are assigned to channel 64 when the integration periods are 64 chips long. In the same configuration, traffic, paging, or synchronization signals are assigned to channels 32, 64, and 96 when the periods are 32 chips long. The number of channels contributing energy to the acquisition process increases as the accumulation periods decrease in length, and can be assigned to odd or even channels depending on the pilot channel assignment. This provides additional energy for use in determining when a correct time offset hypothesis has been chosen by the subscriber unit for a given communication signal.

In typical CDMA spread spectrum communication system, such as a wireless data or telephone systems, base stations within predefined geographical regions, or cells, each use modulator–demodulator units or spread spectrum modems to process communication signals for system users. Each spread spectrum modem generally employs a digital spread spectrum transmission modulator, at least one digital spread spectrum data receiver and at least one searcher receiver. During typical operations, a modem in a base station is assigned to each remote or mobile user or subscriber unit as needed to accommodate transfer of communication signals with the assigned subscriber. Multiple receivers or modems may be used to accommodate diversity processing. For communication systems employing satellite repeaters, these modems are generally placed in base stations referred to as gateways or hubs that communicate with users by transferring signals through the satellites. There may be other associated control centers that communicate with the satellites or the gateways to maintain system wide traffic control and signal synchronization.

Exemplary spread spectrum type communication systems, such as those discussed in the above patents (U.S. Pat. Nos. 4,901,307 and 08/368,570), use a waveform based on a direct sequence pseudonoise spread spectrum carrier. That is, a baseband carrier is modulated using a pseudonoise (PN) binary sequence, or pair of sequences, to achieve a desired spreading effect. PN codes are used to spread the spectrum of all communication signals transmitted over base station- or gateway-to-subscriber links to discriminate between transmissions from different base stations, and between multipath signals. Such PN sequences are sometimes referred to as 'spreading' codes.

Each PN sequence consists of a series of 'chips' occurring over a preselected PN code period at a frequency much higher than the baseband communication signal being spread. An exemplary chip rate for satellite systems is around 1.2288 MHz with a PN code sequence length or period of 1024 chips. However, the present invention is also useful with other chip rates and code lengths, as will be apparent to those skilled in the art. For instance, some terrestrial cellular systems use spreading codes having $2^{15}$ or 32,678 chips. Each communication system design specifies the type and distribution of spreading codes within a communication system according to factors understood in the art. An exemplary generation circuit for these sequences is disclosed in U.S. Pat. No. 5,228,054 entitled "*Power Of Two Length Pseudo-Noise Sequence Generator With Fast Offset Adjustments,*" issued Jul. 13, 1993, and assigned to the assignee of the present invention, and incorporated herein by reference.

A single PN code sequence, or pair of sequences, is generally employed for the spreading function in a communication system. Signals for different cells or beams are generally differentiated by providing different time offsets of the basic PN code sequence for each cell or beam relative to its neighbors. That is, subscriber units operating within the service area of a given beam or cell share a single PN spreading code time offset, while other beams or cells, or sectors, use different offsets of the same PN code. The basic signal timing established by each gateway or base station for users being served on a given frequency is the same.

Information signals to be transferred to system subscribers are generally first digitized as necessary, and encoded and interleaved as desired, to create a basic digital communication signal. Signals addressed to specific users are also modulated by an additional distinct orthogonal spreading function or code sequence assigned to that user's forward link. That is, a unique covering orthogonal code sequence is used to distinguish between different user or subscriber signals within a cell or beam. This coding on the forward link of a given carrier frequency produces subscriber signals also referred to as channels. Such orthogonal sequences or functions are sometimes referred to as channelizing codes, and are applied prior to the final PN spreading codes discussed above.

The resulting PN spread and orthogonally encoded output signals are then typically bandpass filtered and modulated onto an RF carrier, typically by bi-phase modulating a quadrature pair of sinusoids that are summed into a single communication signal. The resulting signals may be further amplified and filtered before being summed with other forward link signals and radiated by an antenna for the gateway. The filtering, amplification, and modulation operations are well understood in the art. Additional details on the operation of this type of transmission apparatus are found in U.S. Pat. No. 5,103,459, issued Apr. 7, 1992, entitled "*System And Method For Generating Signal Waveforms In A CDMA Cellular Telephone*," assigned to the same assignee as the present invention and incorporated herein by reference.

One class of orthogonal binary sequences that are useful for the orthogonal channelizing codes, and also relatively easy to generate, is called Walsh functions. Walsh functions are derived from Walsh function matrices also known as Hadamard matrices. A Hadamard matrix of order n over the real field can be defined recursively as:

$$H_n = \begin{bmatrix} H_{n/2} & H_{n/2} \\ H_{n/2} & \overline{H}_{n/2} \end{bmatrix}$$

where $\overline{H}$ denotes the additive inverse of H, and $H_1=1$ (i.e. $\overline{H}_1=-1$).

Therefore, the first two Hadamard matrices of orders 2 and 4 can be represented as:

$$H_2 = \begin{bmatrix} 1 & 1 \\ 1 & -1 \end{bmatrix}$$

and $$H_4 = \begin{bmatrix} H_2 & H_2 \\ H_2 & \overline{H}_2 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

A Walsh function, then, is simply one of the rows of a Walsh matrix (Hadamard matrix), and a Walsh function matrix of order 'L' is a square matrix containing L functions or sequences, each being L chips (bits) in length.

A Walsh function of order n (as well as other orthogonal functions) has the property that over an interval of L chips (an L-length code symbol) in a string of chips, the cross-correlation between all of the different functions within a set of L-length functions is zero, provided there is temporal alignment. This is independent of data modulation (±1) or function. This is easily understood by observing that exactly half of the chips or bits in every function differ from those in all other functions. This makes such functions highly useful as spreading or channelizing codes for creating orthogonal communication channels on a common carrier frequency.

To create orthogonal channels, the Walsh function size or code sequence length L, is set equal to the desired number of orthogonal channels to be accommodated on each common frequency carrier within the communication system. An exemplary Walsh function size useful for implementing advanced satellite based repeater communication systems is one hundred and twenty-eight (L=128) for gateway-to-subscriber links which creates up to one hundred and twenty-eight different communication signals or channels (including pilot, paging, and synchronization channels) for a given frequency within each satellite beam coverage region. This is typically configured as a pre-defined set or table of sequences comprising 128 Walsh functions, each having a 128 chip length.

As previously discussed, signal demodulation and decoding performance for subscriber units is enhanced by the presence of a pilot signal. A pilot waveform typically uses the all-ones Walsh function that is found in all (real) Walsh function sets, generally designated $W_0$. The use of the all-ones Walsh functions for all pilot signals greatly simplifies the search for the pilot waveform since this effectively applies a constant to the spreading PN sequences. No time consuming or complicated Walsh function analysis is needed until after outer code PN synchronization has been achieved. The Walsh function timing is locked to the PN code cycle since the length of the Walsh function is a factor of the PN sequence length. Therefore, provided base station or gateway offsets of the PN code are multiples of one Walsh symbol or one hundred twenty-eight (128) chips (or the particular chosen Walsh symbol length), then Walsh function timing is known implicitly from the PN spreading code timing cycle.

A subscriber unit or receiver portion for receiving, despreading, and un-encoding communication signals employing the spread spectrum techniques discussed above, is illustrated in the overall view of FIG. 1. This subscriber unit could reside, for example, in a wireless communication device such as, but not limited to, a mobile cellular telephone. At the same time, while subscriber units are generally viewed as being portable or mobile, it is understood that the teachings of the present invention are also applicable to fixed units where remote wireless service is desired. This latter type of service is particularly relevant to using satellite repeaters to establish communication links in many remote areas of the world otherwise lacking a communications infrastructure.

Subscriber units are also sometimes referred to as user terminals or simply 'users' in some communication systems, depending on preference. In addition, a satellite based communication system would generally employ a number of satellites and a large number of subscriber units which are not discussed in detail here. For instance, several satellites might be used that travel in several orbital planes, generally in Low Earth Orbit (LEO). However, those skilled in the art will readily understand how the teachings of the present invention can be applied to a variety of subscriber units, satellite system configurations, or gateways and base stations.

The exemplary subscriber unit receiver or demodulator section illustrated in FIG. 1 uses at least one antenna 10 through which it receives and transfers communication signals to an analog receiver or receiver system 14. This signal transfer may occur using a duplexer element 12 since the same antenna might be used for both transmit and receive functions, and each functional section (input and output) must be isolated from the other at any given time to prevent feedback and damage. However, it is readily understood that some systems employ separate antennas for transmission and reception functions which occur at different frequencies. The antenna configuration, has no impact or direct bearing on implementing the present invention.

Analog receiver 14 receives analog communication signals and provides digital communication signals to at least one digital data receiver 16 and at least one searcher receiver 18. Additional digital data receivers 16$_B$–16$_N$ are used to obtain signal diversity, which may be optional for some system designs. Those skilled in the art will readily recognize the factors that determine the number of digital receivers employed, such as typical level of diversity available, complexity, manufacturing reliability, cost, etc., which are used to provide an initial selection for this number. Generally, only one searcher receiver is used, although this also depends on communication system complexity, number of channels to be searched, desired signal acquisition speed, timing restrictions, etc. as known in the art.

The subscriber unit also includes at least one control processor 20 coupled to data receivers 16a–16n along with searcher receiver 18. Control processor 20 generally provides basic signal processing, timing, power and handoff control or coordination, diversity, and diversity combining functions. Another basic control function often performed by control processor 20, is the selection or manipulation of orthogonal functions or code sequences to be used as part of signal reception processing. This may include the timing offsets used for acquiring various signals.

The outputs of data receivers 16a–16n are coupled to a diversity combiner and decoder 22 which provides a single output to digital baseband circuitry 24 under the control of processor 20. The baseband circuitry comprises the remainder of the processing and presentation elements used within the subscriber unit to transfer information to and from a unit user. That is, signal or data storage elements, such as transient or long term digital memory; input and output devices such as LCD or video display screens, speakers, keypad terminals, and handsets; A/D elements, vocoders and other voice and analog signal processing elements; etc., all form parts of the subscriber baseband circuitry which uses elements known in the art. As shown in FIG. 1, some of these elements may operate under the control of, or in communication with, control processor 20.

Signals received by antenna 10 are processed by analog receiver 14 where they are downconverted and amplified before being translated to an IF or baseband frequency and subjected to filtering and further amplification. The resulting amplified signals are then digitized at an appropriate clock rate and output to data and searcher receivers 16 and 18. This output may be in the form of combined in-phase and quadrature phase channel signals at this point, or in the form of separate I and Q channel signals, and are generally illustrated as separate for purposes of clarity.

As mentioned above, each base station or gateway in current CDMA spread spectrum type wireless or cellular telephone systems transmits a 'pilot carrier' signal. Pilot signals are used by subscriber units to obtain initial system synchronization or frequency and phase tracking of signals transmitted by a communication system. The pilot signal contains no data modulation, and essentially represents the PN spreading functions or codes, code pairs (I and Q channels), used by the communication system. A single pilot is typically transmitted by each gateway or base station for each frequency used and shared by all subscribers receiving signals from that source. For terrestrial repeater systems, sectors may each have their own distinct pilot for improved frequency re-use. For satellite repeater systems, the pilot signal is transferred within each satellite beam frequency and originates with gateways according to the satellite or satellite beam being used for communication links.

Typically, each pilot signal within a communication system is generated using the same PN code with different code timing offsets. This provides signals that can be readily distinguished from each other, while providing simplified acquisition and tracking. Other signals are used to transmit spread spectrum modulated information, such as gateway identification, system timing, user paging information, and various other control signals.

To search for and acquire a forward link CDMA channel or signal, the subscriber unit looks for the strongest pilot signal at an expected PN code time and/or frequency location, also referred to as a PN slot. That is, the searcher receiver is adjusted to observe a particular carrier frequency, considering Doppler effects, with preselected or predicted PN timing, and to detect the strongest signal which is generally the pilot signal. In most communication systems, the pilot signal is allocated additional power to assure proper and efficient, fast, tracking and acquisition, often as high as 4–7 times the power of a typical traffic channel signal. However, this process can use the strongest signal regardless of its function, that is, whether or not it is a pilot signal, as long as the PN code timing is appropriate. In addition, when using the present invention, lower power pilot signals can be used more effectively since energy from multiple signals is utilized, not just that of the pilot signal.

In order to establish or maintain a communication link through a particular digital data receiver, searcher receiver 18 is assigned to scan across preselected PN code timing offsets and Doppler frequency space of received communication signals to acquire a signal. That is, to periodically search data received from analog receivers and determine if a pilot (or other desired signal) is present; or to determine which pilot signal of two or more being received is an appropriate pilot signal for use in subsequent signal decoding.

This is accomplished by establishing or selecting an estimated time offset as a 'hypothesis' of the pilot signal timing. Once selected, a hypothesis is tested by using a signal correlator to despread received communications signals, containing subscriber channel signals, and accompanying noise. The despreading operation uses locally generated reference PN spreading codes, which are applied or combined with the input signals at the selected time offset (hypothesis). A technique used to determine the success of the particular hypothesis, is to integrate the amplitudes associated with signal chips output by the despreader over a preselected time interval. The accumulated values are squared and then summed before comparing to a predetermined threshold. The resulting value has a high probability of exceeding a certain threshold, whenever the timing of the local reference PN codes is the same as the PN timing of the received signal.

Figure 2:
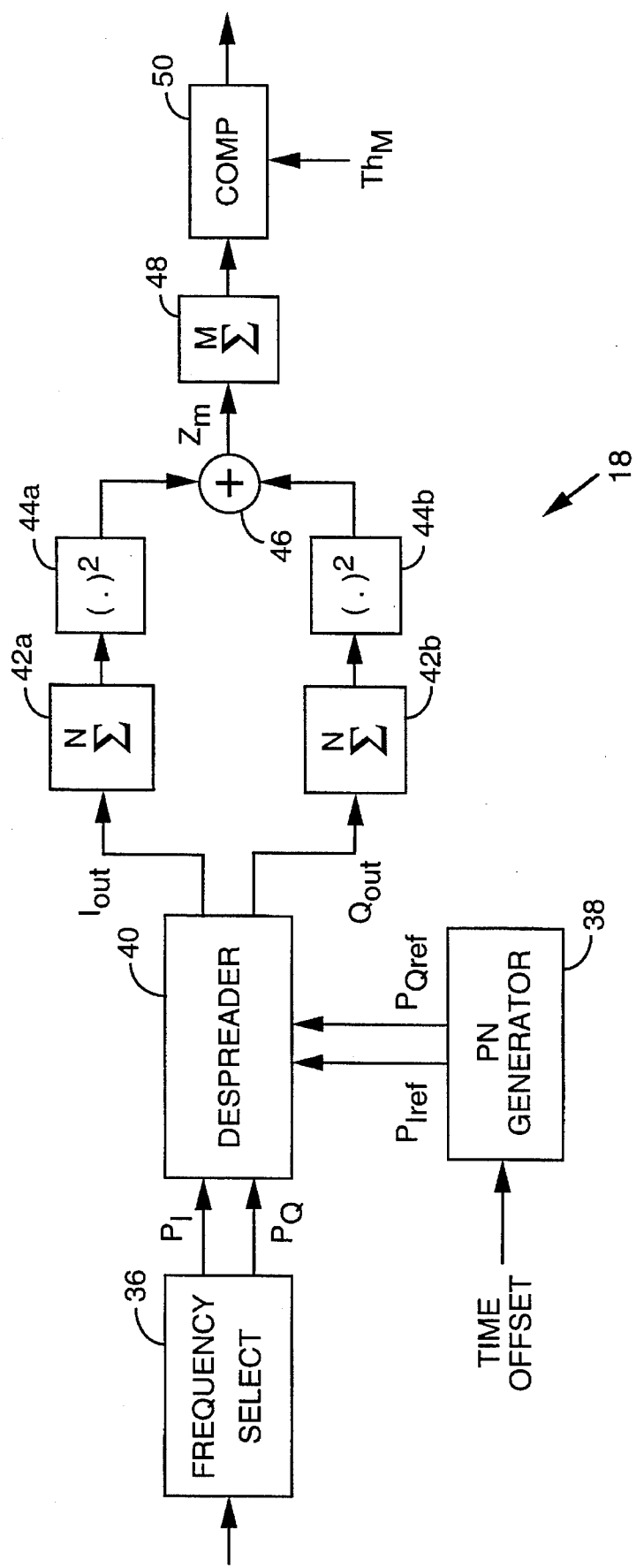
FIG. 2 illustrates an exemplary searcher signal detector for acquiring signals, useful in the apparatus of FIG. 1.

Apparatus useful for performing the task of making the desired energy measurements utilized in making detection decisions, sometimes referred to as computing test statistics, is illustrated in FIG. 2. In FIG. 2, signals output from analog receiver 14 are shown being transferred to frequency selective or adjustment element 36 which serves to adjust the frequency to which searcher 18 is sensitive or tuned. This function serves to scan across the various Doppler frequencies or frequency shifts anticipated for communication signals before timing acquisition occurs. This frequency tuning can be realized using elements known in the art, such as a digital phase rotator.

The output of frequency adjuster 36 is transferred to a despreader or correlator 40 where it is despread relative to a communication system PN spreading code. The digital communication signals being input to despreader 40 are shown as being split or separated into quadrature, $Q_{in}$, and in-phase, $I_{in}$, signal components, although this need not be done for some applications.

A second set of inputs for correlator 40 comprises local reference PN spreading/despreading codes, $P_{Iref}$ and $P_{Qref}$, which are generated in the subscriber unit for Q and I signal components. These PN codes can be provided by one or more code generators 38 or other sources within the subscriber unit. Apparatus for generating such sequences are well known in the art and referred to in the above patents.

The $P_{Iref}$ and $P_{Qref}$ code sequences are applied to despreader 40 at a particular time offset which is to be tested as a preselected pilot signal 'hypothesis'. That is, an estimated time value to be tested by the searcher. This offset value can be provided by subscriber controller 20 discussed above, or as part of a separate searcher receiver controller, not shown, which selects a starting value for this offset. Typically, a random value within a predefined range is chosen as an initial time offset value. The offset is also typically based on certain communication system protocols or operating procedures depending on whether a subscriber unit is undergoing an initial communication system 'cold' start or a 'warm' start, as known in the art. Offset selection procedures are known to system designers skilled in the art and are not discussed in further detail here.

Despreader 40 combines the appropriate PN sequences with the input signals and generates correlated or despread signal components which are output as a series of I and Q channel chips, $I_{out}$ and $Q_{out}$. The correlated signal chips, $I_{out}$, $Q_{out}$, are transferred at the chip rate to each of a pair of accumulators or accumulate and sum units 42a and 42b, respectively. At each point in time, or search space for which searcher 18 formulates a hypothesis of acquisition, a sum of N I-chip amplitudes is formed in accumulator 42a and a sum of N Q-chip amplitudes is formed in accumulator 42b. These sums are referred to as coherent integrations or sums.

The sums generated in accumulators 42a and 42b are transferred to each of two squaring elements 44a and 44b where they are squared, to provide absolute magnitudes. The squaring results are then added together in a summation element or adder 46 to form an overall coherent magnitude value $Z_m$. The value $Z_m$ is related to the overall amount of despread energy received in a signal during the period of integration, and is transferred, at (chip rate)/N, to a third accumulator 48.

Searcher 18 subsequently collects or generates another pair of coherent sums using accumulators 42, from received signal components, squares them together in squaring elements 44a and 44b, and adds them together in adder 46. The results in adder 46 are then added to $Z_m$ to form $Z_{m+1}$ in an accumulator summation element 48. The summation of the new squared amplitudes or energy values with the previous coherent sum is referred to as noncoherent combining. This operation is then repeated M times to generate the sum $Z_M$. Because of the squaring operation, each $Z_m$ value is proportional to the amount of energy captured for that portion of the total input signal which correlates with the locally generated PN codes. That is, that which correlates well within the current energy accumulation window.

The result of non-coherent combining, $Z_M$, is a sum of all energy values for an integration or accumulation interval which can be compared to a threshold value for an acquisition decision. That is, a determination is made whether or not an appropriate time offset has been used in despreading. If a pilot signal is being properly correlated by the searcher receiver, then significant net energy should exist and it should exceed a threshold. Otherwise, the energy values should be relatively low as a result of non-correlation and some cancellations, and be a result of receiving noise or low level interfering signals.

Viewed another way, a window over which a signal is coherently integrated defines or represents N-bit long subsections of the larger local I and Q PN codes which effectively establish I and Q reference vectors in an N-dimensional vector space. To determine what portion of the total input signal correlates with these vectors, I and Q portions of $Z_m$ are formed by projecting the total input signal onto these two reference vectors, and then squaring and summing the lengths of the resulting projections.

When the hypothesis being tested is incorrect, that is, a signal portion (integration interval) does not correlate with the local PN's, the resulting $Z_M$ receives contributions from many sources. Noise and interference in the received signal, the signal for which acquisition is sought (pilot), and other subscriber channels or signals (on the order of 127) associated with the signal, all contribute energy to $Z_M$.

Figure 3:
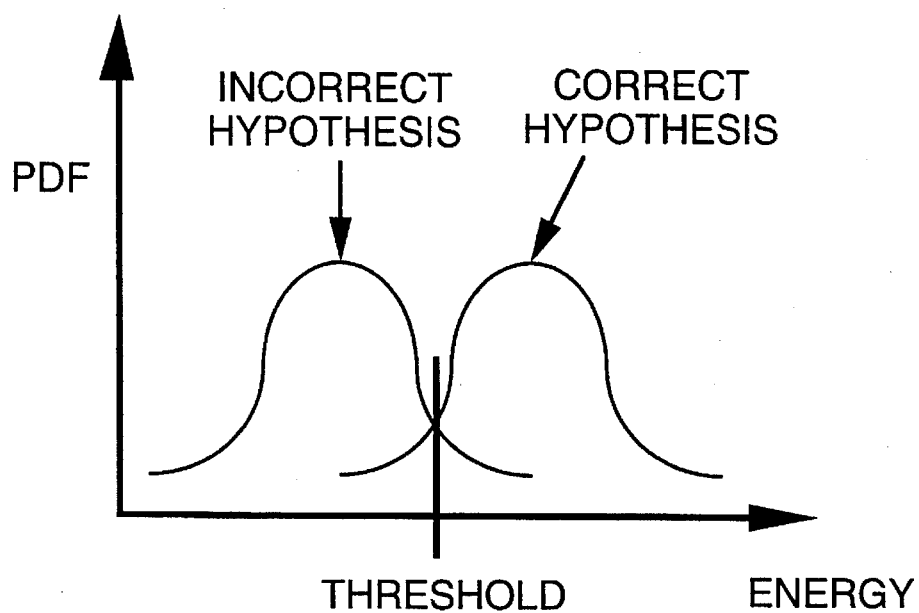
FIG. 3 illustrates graphical representations of probability curves for finding correct hypotheses using the detector of FIG. 2 without the invention.

As a random variable, $Z_M$ has an associated probability density function (PDF) having a form as generally illustrated in FIG. 3. A PDF associated with an incorrect hypothesis turns out to be fairly consistent in value or structure regardless of the acquisition technique being used. When a correct hypothesis is tested, the pilot and the locally generated PN's are properly aligned and produce a large (deterministic) correlation component in $Z_m$. In the PDF graph shown in FIG. 3, this component shifts the mean of the PDF to the right. The noise and the remaining 127 channels correspond to the variance of this shifted PDF.

In a simple single value or single-dwell acquisition process, M noncoherent combinations or summations are performed by element 48 in the apparatus of FIG. 2, resulting in an energy value $Z_M$, which is then compared to a detection threshold $Th_M$ in a comparison element 50. This can be done, for example, by inputting the value $Z_M$, at (chip rate)/(N×M), as one input of a two input comparator element, while providing the threshold value $Th_M$ as the second input. If no pilot is present at this hypothesis, only noise and interference have been accumulated and $Z_M$ will generally fall below the desired detection threshold. On the other hand, if searcher 18 is aligned at a correct hypothesis, the sum is larger in value, and is generally large enough to exceed the detection threshold.

However, searcher 18 can consume a fair amount of time to sample and discard various hypotheses because the search space is very large. This is typically a more significant problem when the subscriber unit is undergoing an initial "cold start" within the communication system. Acquisition searching can be improved by using what is termed multiple-dwell hypothesis testing. In this approach a series of threshold levels $Th_m$ (m=1, 2, . . . M) are used to quickly discard incorrect hypothesis and align to the offset timing of the pilot signal. This provides more efficient and higher speed searching.

In the multiple-dwell process, each time another energy accumulation term is added to the noncoherent sum $Z_{m-1}$, the resulting value $Z_m$ is compared to a threshold $Th_m$. If $Z_m$ exceeds $Th_m$, then the searcher proceeds to form the sum $Z_{m+1}$ using the next set of signal energies. If on the other hand $Z_m$ falls below the $m^{th}$ threshold, then the contents of accumulator 48 are cleared, and a next hypothesis is selected without forming all M noncoherent sums. A detection only occurs if all of the thresholds from 1 to M are exceeded.

Figure 4:
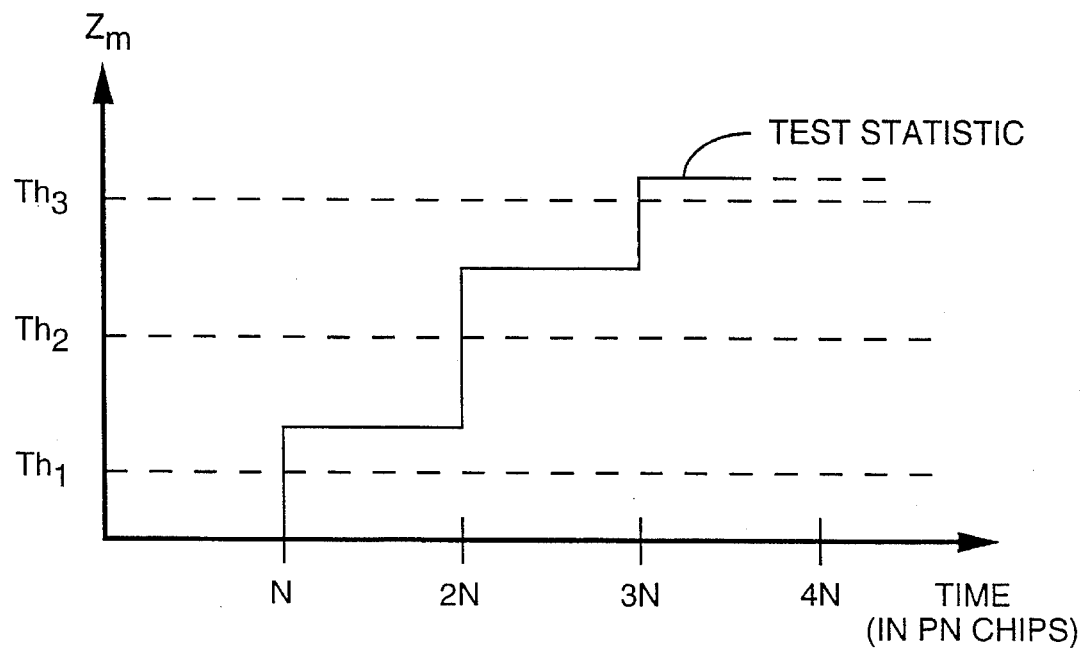
FIG. 4 illustrates the use of multiple thresholds in the apparatus of FIG. 2.

This threshold testing process is illustrated graphically in FIG. 4 where a series of test statistics, $Z_m$, are shown, each exceeding the value of one of the corresponding first three thresholds. If the threshold values are properly set or selected, the multiple dwell approach provides lower acquisition times by allowing searcher 18 to dispense with incorrect hypotheses more rapidly. Further discussion of a two-level multiple-dwell acquisition is also found in U.S. patent application Ser. No. 08/283,304, entitled *"Method And Apparatus For Performing Search Acquisition In A CDMA Communication System"*, which is incorporated herein by reference.

When a hypothesis test passes all M selected thresholds, a tentative pilot detection is realized. At this point, the search process generally enters a verification phase where the presence of the pilot is verified further before the subscriber unit begins to attempt signal demodulation. In addition, a more precise estimate of the pilot frequency is obtained since demodulator frequency trackers are generally not equipped with as wide a frequency offset capability as searcher receivers.

The integration process and searching function are generally optimized in order to decrease the integration time, while allowing a reasonable high probability of pilot detection. Search parameters such as the number and frequency overlap for Doppler frequency ranges, referred to as bins, used in testing are adjusted to provide the fastest signal acquisition. Other parameters such as the length of time for coherent integration, the number of non-coherent combines, the number of threshold levels used, and the spacing between successive hypotheses or PN time offsets to be tested, are also adjusted to minimize the time consumed by searches. Since a searcher receiver does not 'know' where chip boundaries are, experience shows that using hypotheses that are ½ chip apart in timing works well.

It is known that the length of the signal amplitude accumulation or integration interval N is inversely related to the Doppler frequency sampling bin size, and directly related to the total number of bins required to cover a given frequency range. This is discussed in further detail in *"Principles Of Spread Spectrum Multiple Access Communication"* by A. J. Viterbi, published in 1994. Therefore, a primary factor in optimizing the hypothesis testing is the value chosen for N.

It is advantageous to allow several different values of coherent integration time N because small N (e.g. N=32) produces smaller acquisition times when the pilot is a relatively strong signal. For example, where the chip energy $E_c$ is within 16 dB or less of the interference signal level $I_o$. This is because small N corresponds to wide Doppler bins, so that fewer searches over Doppler frequency are required, provided the pilot is sufficiently strong. On the other hand, for a weaker pilot signal, larger values of N produce smaller acquisition times, because the increase in sensitivity more than compensates for a need to search more Doppler bins.

It is also understood that for a given total number of chips 'k' used in the PN spreading code, setting the value of N equal to k while setting the combine iteration value M equal to 1, provides the best integration result. That is, one long accumulation of energy over an interval equal to the total PN code sequence length, produces the greatest likelihood of separating hypotheses that cover periods of pilot and non-pilot signal reception. Using coherent integration intervals that are as long as possible generally provides the fewest false alarms and highest detection probabilities.

However, as a rule, larger values of N require larger numbers of frequency bins to search the Doppler frequency space. It is disadvantageous to consume a longer amount of time integrating the incoming signal data which can delay subscriber unit communications, or to provide a larger number of frequency bins. For example, accumulating over the length of a typical terrestrial wireless system PN spreading code consisting of 32,678 chips, would require an unacceptably long search time. Such a value for N would only be useful for very weak pilot signals.

Therefore, an attempt is made to chose a value for N that reduces the overall amount of time occupied in performing coherent accumulations. An integration length of 64 (N=64), which is typically the length of channelizing functions for terrestrial repeater type systems, represents a more reasonable value for N, while still maintaining signal orthogonality.

However, satellite repeater based communication systems, and some future terrestrial systems, are expected to use longer orthogonal code lengths of 128 chips with shorter 1024 chip PN spreading codes. As before, an integration length of 1024 covers the entire code sequence length, but a value this large requires unacceptably long search times. If the accumulation interval, N, is set at the 128 chip value to maintain orthogonality, search times are longer than those obtained with N equal to 64 for all but the weakest pilots.

Unfortunately, with shorter integration intervals, such as N equal to 64, channel code orthogonality is no longer assured. While the Walsh functions used to cover the data are always orthogonal over their full length, shorter segments of the functions, such as where N is one-half or less of the total function length, are not. When this happens, the Walsh functions for channel 0 (pilot) and other channels are no longer always orthogonal. That is, when using 128 Walsh functions of length 128, at least one of the sequences, here one designated as number 64, will interfere with the $0^{th}$ code sequence or function generally used for pilot signals.

This can be understood by remembering that for any set of Walsh functions, one-half of the values are minus ones over each code sequence length except for the $0^{th}$ code. That is, each sequence is half ones and minus ones over its entire length. However, this is not true for some sequences over short segments of their length. For short integration intervals such functions can begin to interfere with each other during the signal acquisition process and negatively impact the hypothesis testing results.

Applicants have discovered that by establishing certain constraints on the integration operation and boundary placement, a more robust acquisition process results for even short integration intervals. Then, by further establishing a certain pattern of signal distribution among the orthogonal signal channels, acquisition is even further improved. Energy previously treated as a source of interference to be avoided, can be used to improve signal acquisition.

A new acquisition technique can be illustrated using the basic searcher structure of FIG. 2, and by generating Z for several exemplary cases. It is assumed for this discussion that an optimal value of N shorter than the code length has been selected based on expected pilot signal strength. When N is fixed, the relative merits of coherent and noncoherent combining are not being compared. The following discussion also focuses on changes in the mean of Z, as opposed to the average noise energy (variance) of Z at a correct hypothesis, which does not have as significant an impact. For purposes of clarity, the basic concepts involved in the present invention are illustrated using Walsh functions of length four for the orthogonal encoding as shown above (where $H_4$ represents the Hadamard matrix whose rows constitute the available Walsh functions $W_0$ to $W_3$). Those skilled in the art will readily understand how the invention applies to larger orthogonal code sequences.

First, the amplitude, including polarity, of data transferred over orthogonally encoded Walsh channel $W_i$ is represented as $A_i$. This results in the following signal amplitude values being transferred when the above $W_0$–$W_4$ functions are used to encode or cover the data on channels 0 through 3.

| Channel 0 | $A_0$ | $A_0$ | $A_0$ | $A_0$ |
| Channel 1 | $A_1$ | $-A_1$ | $A_1$ | $-A_1$ |
| Channel 2 | $A_2$ | $A_2$ | $-A_2$ | $-A_2$ |
| Channel 3 | $A_3$ | $-A_3$ | $-A_3$ | $A_3$ |

If the coherent accumulation time is a full Walsh function or symbol length, that is N equals 4, then all four Walsh channels are orthogonal to each other regardless of their polarity, due to the data modulation.

However, consider a shorter integration interval of N equals 2. Here, the first integration period covers Walsh chips 0 and 1 and the second integration covers Walsh chips 2 and 3. It is readily seen that over this interval, the $W_2$ sequence is not orthogonal to the sequence of channel zero, $W_0$. These results are presented in Table I below.

TABLE 1

| First Integration | | Second Integration | |
|---|---|---|---|
| $A_0$ | $A_0$ | $A_0$ | $A_0$ |
| $A_1$ | $-A_1$ | $A_1$ | $-A_1$ |
| $A_2$ | $A_2$ | $-A_2$ | $-A_2$ |
| $A_3$ | $-A_3$ | $-A_3$ | $A_3$ |

Consequently, the sums, $S_m$, resulting from integrating or accumulating over these two time intervals are:

$$S_{0-1}=2(A_0+A_2), \text{ and} \quad (1)$$

$$S_{2-3}=2(A_0-A_2) \quad (2)$$

Ignoring noise in this analysis, identical sums are obtained on average in both the I and Q channels for searcher 18. The I sum and the Q sum for each interval are squared and added together in adder 46, which provides the $Z_m$ outputs of:

$$Z_{0-1}=(S_{0-1}{}^I)^2+(S_{0-1}{}^Q)^2=8(A_0+A_2)^2 \quad (3)$$

$$Z_{2-3}=8(A_0-A_2)^2 \quad (4)$$

It can be seen that if $A_0$ and $A_2$ have the same polarity, $Z_{0-1}$ is relatively large while $Z_{2-3}$ is relatively small. On the other hand, if these two amplitudes have opposite polarities, $Z_{0-1}$ is large and $Z_{2-3}$ small. Since the modulation (polarity) on $A_2$ is not known in advance, it is unknown which of the $Z_m$ sums represents a sum of the amplitudes and which is the relative difference. This variation in the integration results from the non-orthogonal interference mentioned earlier.

Expanding this analysis by using Walsh functions having a length of 128, $W_0$–$W_{127}$, and integrating over one-half length intervals or N equals 64, it can be seen that Walsh channel 64 is not orthogonal to Walsh channel 0. Therefore, channel 64 could introduce coherent interference during acquisition, when testing a correct PN sequence time-offset hypothesis.

However, using the above example, the sum of the two $Z_m$ energy values $Z_{0-1}$ and $Z_{2-3}$ has the form:

$$Z_{symbol}=16(A_0{}^2+A_2{}^2) \quad (5)$$

This test statistic, which is now called $Z_{symbol}$, spans an entire code sequence length, and incorporates the energies of both channels 0 and 2 regardless of their relative modulations and signal strengths. So using acquisition windows, or integration intervals, that are half of the length of a full Walsh function can be effective provided that threshold comparisons are only performed after every other noncoherent sum. That is, threshold comparisons are only performed at Walsh symbol boundaries. This allows the energy in channel 64 to actually be used to advantage if care is taken about when noncoherent sums are compared to thresholds.

If a value of N equal to one-fourth of the length of a Walsh symbol or code sequence is used, additional terms lose orthogonality. For the above example, this corresponds to N equals 4, which results in four Walsh channels not being orthogonal over an accumulation interval. The four partial energy accumulation values $Z_m$ have the form:

$$Z_0=2(A_0+A_1+A_2+A_3)^2 \quad (6)$$

$$Z_1=2(A_0-A_1+A_2-A_3)^2 \quad (7)$$

$$Z_2=2(A_0+A_1-A_2-A_3)^2 \quad (8)$$

$$Z_3=2(A_0+A_1-A_2+A_3)^2 \quad (9)$$

After expanding the squares and combining terms to generate the value for $Z_{symbol}$, all cross terms cancel and the result is:

$$Z_{symbol}=8(A_0{}^2+A_1{}^2+A_2{}^2+A_3{}^2) \quad (10)$$

In this case, combining the results of four short accumulations or integration intervals so as to span the length of a single Walsh symbol, incorporates the energy of four Walsh channels into the test statistic used by searcher receiver 18. This provides additional energy for the searcher to use in detecting communication system pilots and timing, and results in a more robust acquisition mechanism for establishing communication links.

The results of the above analysis can easily be expanded to larger orthogonal functions or code sequences using substitution. For example, the above $H_4$ matrix can be expanded to a $H_{128}$ matrix by replacing each '1' with a $H_{32}$ matrix and each $-1$ with a $-H_{32}$ matrix, resulting in:

$$H_{128} = \begin{bmatrix} H_{32} & H_{32} & H_{32} & H_{32} \\ H_{32} & -H_{32} & H_{32} & -H_{32} \\ H_{32} & H_{32} & -H_{32} & -H_{32} \\ H_{32} & -H_{32} & -H_{32} & H_{32} \end{bmatrix}$$

It can be readily seen that the same relative results are obtained using $H_{128}$ ($W_0$–$W_{127}$) as are found when using $H_4$ ($W_0$–$W_3$). When N equals 64 the test statistic incorporates energy from two channels, 0 and 64, and when N equals 32 energy from four channels, 0, 32, 64, and 96, is incorporated. At the same time, if $W_1$ is used as a pilot instead of the traditional $W_0$ function, then energy from channels 1 and 65 is incorporated when N equals 64, while energy from channels 1, 33, 65, and 97 is incorporated when N equals 32.

That is, when the number of Walsh channels (and length of the Walsh functions) is L (128) and the length of the coherent accumulation period is N (128, 64, 32, 16, ... ), then the number of channels whose energies are combined as useful signal energy using the present invention is equal to L/N (1, 2, 4, 8, ... ). The remaining Walsh channels, L–L/N (127, 126, 124, 120, ... ), contribute no energy, nor interference, to this process because they appear orthogonal over these integration periods. They do not interfere with the pilot signal acquisition.

The main limitation is the number of channels for which it can be reasonably predicted or guaranteed that a significant amount of energy transfer will be maintained at any one time. For an integration period N equal to $L/2^n$ ($2^n=1, 2, 4,$ ... ), traffic, paging, or synchronization signals with a consistent or guaranteed minimum amount of energy should be preferentially assigned to channels that are spaced apart from the pilot channel by increments of $sL/2^n$, where n is a positive integer and s equals 1 through $2^n-1$ (1, 3, 7, ... ). Therefore, the set of contributing channels is $\{W_x: x=0, N, 2N, ... L-N\}$. Other channels or Walsh functions can clearly be used for a pilot signal if desired within a given communication system, and this relationship extends to any such pilot channel, over the total length of the functions being used.

Figure 5:
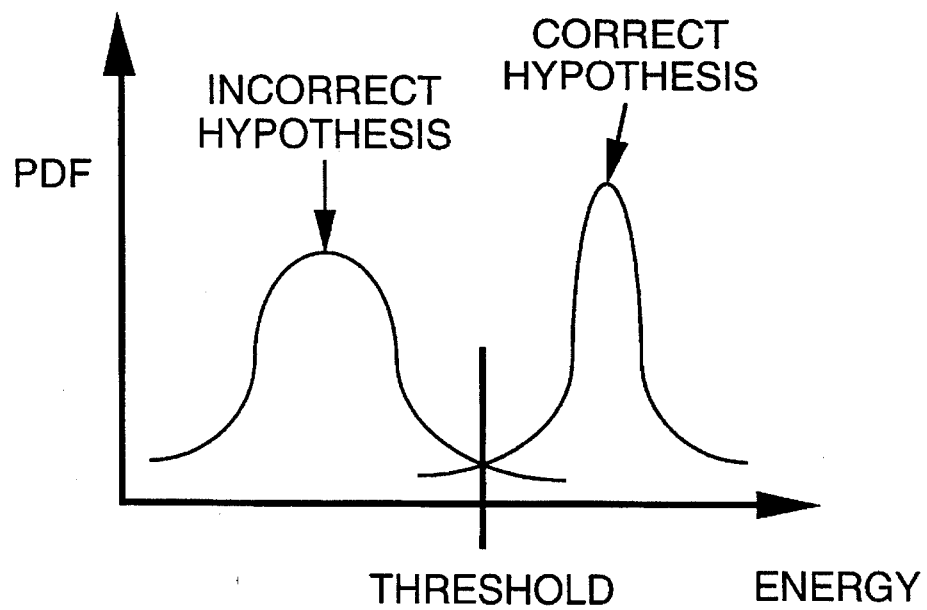
FIG. 5 illustrates graphical representations of probability curves for finding correct hypotheses using the invention.

A noticeable improvement over conventional acquisition techniques occurs when using the multiple orthogonal function acquisition technique of the present invention in testing correct hypothesis. The differences can be seen in the illustration of FIG. 5 as compared to FIG. 3, as previously discussed. The deterministic correlation component produced by the pilot is augmented by an additional deterministic component proportional to the energy in channel 64. This means that the right shift of the PDF is greater in this case than in conventional signal acquisition. Since the distance between the means of the correct and incorrect PDFs is greater using multiple Walsh channel acquisition, the probability of a miss for a fixed false alarm probability (or vice versa) can be made smaller than in conventional acquisition techniques. In addition, the remaining 126 channels appear orthogonal to the I and Q basis vectors and contribute no energy to $Z_M$. This results in a smaller variance for $Z_M$, as illustrated in FIG. 5, which also contributes to smaller error probabilities.

Each Walsh symbol, or function, is 128 chips long in the present example, although other lengths are well known in the art and would also fall within the teachings of the invention. If a PN spreading code sequence having a length of 1024 chips is used, then there would be 8 Walsh symbols (128 chips per Walsh symbol for 1024/128=8) during a single PN code period or interval. The coherent accumulations discussed above are timed so that they are aligned to Walsh symbol boundaries. That is, threshold tests are performed only when sufficient M accumulations over period N results in reaching a symbol boundary. The coherent integrations must align with the receiver's concept of Walsh symbol timing, correct assuming the PN timing is correct, and the sum must be performed over an entire symbol without crossing a symbol boundary. It is not necessary that these windows align with 0 or the start of the PN spreading code, only that the receiver knows where the start is.

Figure 6:
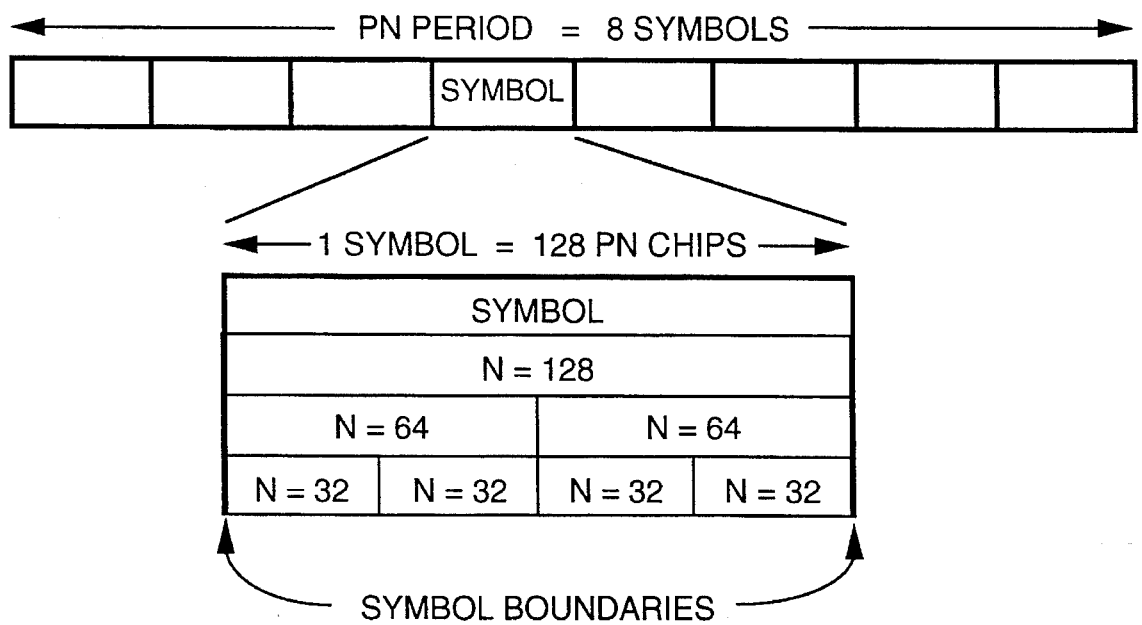
FIG. 6 illustrates exemplary relative symbol timing in the apparatus of FIG. 2 when operating according to the principles of the present invention.

This is illustrated in FIG. 6, where various values of N are used to divide a given Walsh symbol period into a series of one or more integration or accumulation periods, also known as the coherent accumulation windows. It is readily understood that the coherent windows are configured such that consecutive contiguous coherent integrations that are powers of 2 in chip length (up to the length of the Walsh symbol), that is $2^n$ accumulations, are completed during one Walsh symbol. In FIG. 6, n equals 0, 1, or 2, and N equals 128, 64, or 32, respectively.

One potential concern for some applications is the impact on the speed of signal processing for the implementation shown in FIG. 2 during transitions between PN code timing offset hypotheses. For example, consider the sequence of events associated with a failed threshold test using a multiple dwell process. The operations of squaring and adding the I and Q coherent sums and then performing a threshold comparison, take several chip times to accomplish. Concurrent to these operations, accumulators for the coherent integration process must already be collecting data for the next coherent sum, in case the threshold is exceeded. If a test statistic fails to exceed the threshold, the searcher must move to the next PN offset hypothesis and begin accumulating again. If the local subscriber PN generator is simply delayed by one chip in moving to the next hypothesis, the hypothesized symbol boundaries are also delayed by a single chip.

The use of multiple Walsh channel data for acquisition generally does not work efficiently if the first coherent sum in a hypothesis test fails to begin on a symbol boundary. Consequently, if the threshold test and transition to the next hypothesis are not accomplished in a single PN chip period, the searcher must wait for the next symbol boundary before it can begin accumulating data at a new time offset hypothesis. Since this would mean a delay of 128 chips in duration, such idle times can have a significant and detrimental impact on acquisition times. Two possible methods of mitigating such time penalties are outlined below.

One potential solution is to test timing hypotheses in non-sequential order. For example, if the threshold test and transition to the next hypothesis are accomplished over an interval of five chips in length, then offset hypotheses that are separated by five chips are tested. The offset hypotheses could be tested in an order such as, but not limited to:

$$0, 5, 10, \ldots, 1020, 1, 6, \ldots, 1021, 2, 7, \ldots$$

This sequence has an advantage in that it cycles through all 1024 hypotheses (possible offsets in the 1024 length PN code) before repeating, and the only nonproductive time is the five chip delay between each hypothesis. The searcher hardware implements this feature by providing a 5-chip jump, offset change, at the local PN generator. That is, the output of the local PN generator can simply be disengaged or interrupted, or generator operation disabled, for a period of five chips before recommencing despreading operations. This is easily controlled by a searcher controller element or subscriber unit controller 20, which can provide resettable commands as to the size of incrementing steps used between hypotheses.

Another approach is to add a next-hypothesis accumulator (or time share an existing data accumulator during certain periods) to collect data corresponding to the next hypothesis (1 chip later) to be tested. This approach generally avoids transition delays and more complicated control operations. A block diagram of apparatus useful for implementing this approach is illustrated in FIG. 7, and a brief description of its operation is given below.

Figure 7:
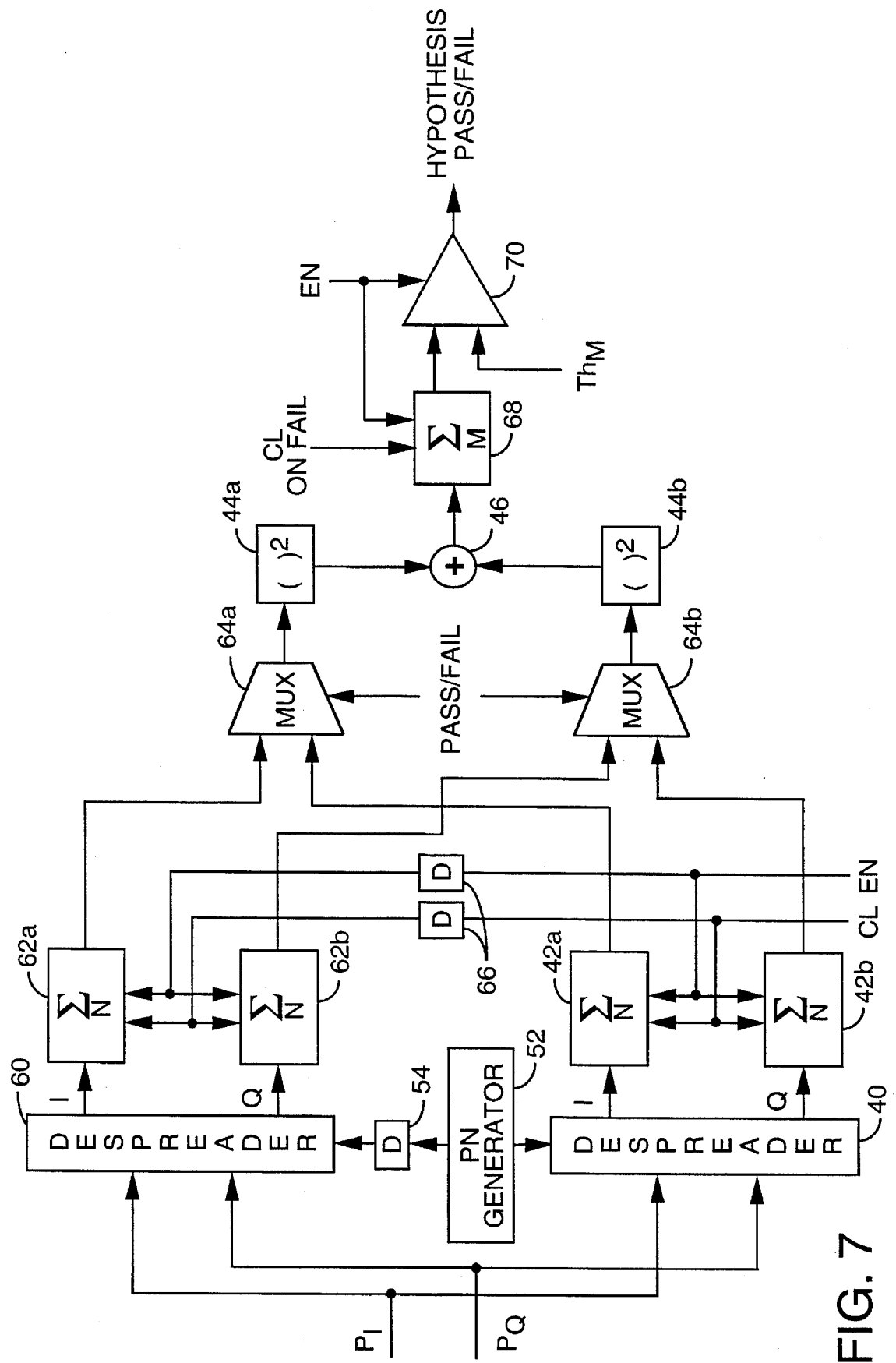
FIG. 7 illustrates an exemplary embodiment for implementing hypothesis adjustment for the apparatus of FIG. 2.

Referring to FIG. 7, the despreader 40 and accumulators 42a and 42b represent the searcher front end despreader and accumulator structures shown for the apparatus of FIG. 2. As before, received I and Q signal chips are combined with appropriate PN code sequences from PN generator 52, such as through despreading or correlation element 40. The despread signals are then accumulated, collected and summed together, over a desired integration period using accumulators 42a and 42b, respectively. The results of this summation are passed to squaring elements 44a and 44b, where they are squared before being summed together in adder 46 to generate a coherent sum $Z_m$. A series of summation results, $Z_m$, from adder 46 are then added together in an accumulator summation element 68 to produce the non-coherent combination value or test statistic $Z_M$.

The remaining structure of FIG. 7 is used to create a second set of signal processing paths, incorporating both I and Q data, for accumulating a sum corresponding to the next hypothesis to be tested if the current test fails. These signal paths are illustrated in the upper portion of FIG. 7. At the same time that signals, I and Q chips, are input to signal combiner or despreader 40, they are input to a second signal combiner or despreader 60. These signals are also combined with the output of PN generator 52, and the results transferred to accumulators 62a and 62b. Just as in the case of accumulators 42a and 42b, a series of N chips, amplitude values, are summed together in accumulators 62a and 62b.

However, a delay element 54 is connected in series with the output of PN generator 52 going to despreader 60, which delays that signal input. The period of delay produced by element 54 is substantially equal to one chip period in length, and serves to cause the signal correlation produced by despreader 60 to occur one chip period later than for despreader 40.

After N chips are accumulated and summed together in each of accumulators 42a, 42b, 62a, and 62b, the resulting values are latched or otherwise temporarily stored and provided to their respective outputs. At this time, the accumulation stages of elements 42a, 42b, 62a, and 62b are then cleared and summation commences again without ignoring a chip or being delayed by a chip period. A set of 'clear' and 'enable' commands can be provided from a control source, such as processor 20 to control the operation of the accumulation stages or registers and enable outputs for accumulators 42a, 42b, 62a, and 62b. In an exemplary embodiment, the enable command or signal is provided to allow the accumulators to accumulate and sum. When the enable command is deactivated or enters a 'not enabled' state, the current contents of the accumulators are latched to the outputs. The 'clear' command is used to clear the current contents of the accumulators. A delay is imposed on such commands for accumulators 62a and 62b by a set of delay elements 66. Due to this delay, the latching and clearing steps occur one chip earlier in accumulators 42a and 42b than in accumulators 62a and 62b.

A hypothesis test begins with multiplexers 64a and 64b set to connect the outputs of coherent accumulators 42a and 42b to squaring devices 44a and 44b, respectively. After the coherent sums are squared and summed in adder 46, the result is placed in accumulator 68 which has been previously cleared. The current value in accumulator 68 is compared to a threshold in comparator 70. If the value in accumulator 68 exceeds the threshold in comparator 70, then the multiplexers are unchanged and the next set of coherent sums are squared and added to the current contents of accumulator 68. On the other hand, whenever the newly updated contents of accumulator 68 fail to exceed the threshold, accumulator 68 is cleared, the multiplexers change to connect accumulators 62a and 62b to squaring devices 44a and 44b, respectively, and the next pair of coherent sums are taken from the delayed hypothesis portion of the circuit. Once these sums have been squared, added, and placed in accumulator 68, the multiplexers are reset to connect accumulators 42a and 42b to the squaring devices.

A transition to a new time offset, hypothesis, for PN generator 54 takes place N chips (one integration interval) after a threshold failure. This transition is easily accomplished by disabling the generator for one clock cycle. During this delay period, accumulators 42a, 42b, 62a, and 62b, are also disabled for one chip period to prevent them from processing what would be a repeated signal chip. This approach entails only a single chip period time penalty for changing hypotheses, which is more acceptable than waiting for a full Walsh symbol period.

The embodiments described above, exploit the benefits of using multiple channel energy for acquisition, while providing a range of N appropriate to the range of pilot strengths expected in communication system usage. However, while the above embodiments improve the signal acquisition process for a spread spectrum communication system user, it has also been recognized by the inventors that further enhancement of the acquisition process is possible. Such an improvement occurs when signals are allocated among the various orthogonal channels in a particular manner. That is, the ability to utilize energy in multiple channels means that it is advantageous to acquisition if there is a high probability that the particular multiple channels are in use. The greatest benefit for this process is realized when the amount of energy is relatively high in the channels of interest. The presence of a higher average energy in these channels can be obtained if certain signals are assigned to these channels preferentially.

For the above example where L is 128, the highest priority, or preferred signal assignment protocol, is to see that orthogonal channel 64 is used. That is, to see that channel 64 contains a substantially continuous level of energy or power. The use of channel 64 aids acquisition when N is 64 or 32, while power residing in channel 32 only aids acquisition when N is 32. This translates to using the Walsh function $W_{64}$ first for encoding information or data to be transferred over traffic channels in the communication system. The next highest priority is to then to see that channels 32 and 96 are used, or Walsh functions $W_{32}$ and $W_{96}$, and so forth. Each time smaller integration or accumulation intervals are to be used, signal traffic is maintained in more closely spaced channels. The chief limitation for this process being the number of channels that can realistically be maintained at a high power level, or used for strong signals, at any given time. It is contemplated that maintaining power on more than 4 or 8 channels is unlikely.

One method of achieving the required channel assignments is to utilize a scheme of "bit-reversed" Walsh channel allocation. Traffic and overhead channels should be allocated to Walsh channels in the order $W_0$, $W_{(L/2)}$, $W_{(L/4)}$, $W_{(3L/4)}$, $W_{(L/8)}$, ... etc. Those skilled in the art will understand that this allocation pattern corresponds to allocating traffic channels in a bit-reversed order, and how to use known techniques and apparatus to achieve this.

An alternative to using traffic channels to secure additional energy in the multiple channel acquisition process is to use paging and synchronization channel functions. That is, dedicate the transfer of paging and synchronization information to these channels or slots to insure they are always being used. Generally, paging signals are 'hotter' or operating with more average energy or power than synchronization signals. By assigning the pilot and paging channels to these specific channel positions or locations, there is a larger amount of energy that can be readily used to acquire signals or track signal timing for communication system users. This can be used to either reduce the time required for signal acquisition or to improve acquisition reliability and robustness.

Therefore, what has been described is a new technique for using energy in multiple Walsh function encoded channels in a spread spectrum communication system to acquire timing of pilot or other desired signals. Furthermore, a technique is disclosed in which preferential assignment of traffic channels or certain system functions to key orthogonal channels, improves signal acquisition. This technique results in an increase in the effective pilot power when testing a correct hypothesis, and also eliminates the potential for coherent interference from other Walsh channels in a cell, beam, or sub-beam by making them orthogonal over the integration window.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, this technique is useful for other Walsh function lengths and could be used in advanced non-satellite wireless systems as well. Thus, the present invention is not intended to be limited to the embodiments shown herein but is to be accorded the widest scope consistent with the principles and novel features disclosed herein.

What we claim is:

1. A method of acquiring time synchronization with one or more orthogonal channel signals in a spread spectrum communication system in which one or more communication signals are received and demodulated by system subscribers, comprising the steps of:

receiving one or more communication signals each comprising multiple channel signals which are orthogonally encoded using one of a preselected set of Walsh functions which are spread using at least one common pseudorandom noise (PN code) sequence applied at one of a plurality of timing offsets relative to each other within said system;

selecting a PN code sequence time offset value to use in a receiving subscriber unit;

despreading said communication signals by applying said PN code sequence at said selected time offset to produce encoded symbols;

coherently accumulating amplitudes of encoded symbols over a predetermined time interval equivalent to a length of said Walsh functions divided by a factor of $2^n$, where n is a positive integer;

squaring the results of said coherent accumulation;

combining square products over an interval commencing and ending at Walsh function boundaries as selected by the receiving subscriber unit;

comparing results of said combining to at least one threshold value;

selecting said time offset chosen by said receiving subscriber unit as a time offset for a desired orthogonal channel signal when the combining results exceed said threshold; and altering said time offset value selection and repeating said despreading, accumulating, squaring, combining, and comparing steps in order until said threshold is exceeded.

2. The method of claim 1 wherein said altering step further comprises the step of determining when said combining results exceed at least two predetermined threshold values.

3. The method of claim 1 wherein the step of combining comprises accumulating square products and summing them together over an interval commencing and ending at said Walsh function boundaries.

4. The method of claim 1 wherein the channel signal to be acquired is a pilot channel signal.

5. The method of claim 1 wherein the channel signal to be acquired is a paging channel signal.

6. The method of claim 1 wherein the channel signal to be acquired is a relatively strong traffic channel signal.

7. The method of claim 1 wherein said coherent accumulation occurs over an interval $L/2^n$ long, with L being the length of Walsh functions used, and a pilot signal is transferred over a first channel and relatively strong signals are preferentially transferred on channels that are spaced apart from the first channel by increments of $sL/2^n$, where n is a positive integer and s equals 1 through $2^n-1$.

8. The method of claim 7 wherein said Walsh functions have a length of 128 chips and a pilot signal is transferred over channel 0 while communications traffic is transferred over channels 32, 64, and 96.

9. The method of claim 7 wherein said orthogonal codes are Walsh functions of length 128 and a pilot signal is transferred over channel 1 while communications traffic is transferred over channels 33, 65, and 97.

10. The method of claim 7 wherein said strong signals comprise a paging signal.

11. The method of claim 7 wherein said Walsh functions have a length of 128 chips and a pilot signal is transferred over channel 0 while paging signals are transferred over at least one of channels 32, 64, and 96.

12. The method of claim 7 wherein said strong signals comprise a synchronization signal.

13. Apparatus for acquiring time synchronization with one or more orthogonal channel signals in a spread spectrum communication system in which one or more communication signals are received and demodulated by system subscribers, comprising:

a receiver for receiving one or more communication signals each comprising channel signals which are orthogonally encoded using one of a preselected set of Walsh functions which are spread using at least one common pseudorandom noise (PN code) sequence applied at one of a plurality of timing offsets relative to each other within said system;

means for selecting a PN code sequence time offset value and for generating said PN sequence with said selected time offset, being responsive to a reselect input for altering said selected time offset value and re-generating said PN code sequence with said altered time offset value;

a signal despreader connected to receive communication signals and said PN sequence, and despread said communication signals into encoded symbols by applying said PN code sequence at said chosen time offset;

a coherent accumulator connected to receive encoded symbols and to sum amplitudes for encoded symbols together over a predetermined time interval equivalent to the length of said Walsh functions divided by $2^n$, where n is a positive integer;

product means connected to said coherent accumulator for receiving and squaring the summation results;

means for combining connected to receive and integrate square products over an interval commencing and ending at Walsh function boundaries as selected by the receiving subscriber unit;

means for comparing connected to receive and to compare results of said integration to at least one threshold value; and means for generating a reselect command connected to said means for selecting and generating, and to said means for comparing, for generating a reselect command after a comparison to a threshold when said threshold is not exceeded.

14. The apparatus of claim 13 wherein said means for comparing uses at least two predetermined threshold values.

15. The apparatus of claim 13 wherein said means for combining comprises at least one accumulation element for storing and adding together square products over an interval commencing and ending at said Walsh function boundaries.

16. The apparatus of claim 13 wherein the channel signal to be acquired is a pilot channel signal.

17. The apparatus of claim 13 wherein the channel signal to be acquired is a paging channel signal.

18. The apparatus of claim 13 wherein the channel signal to be acquired is a relatively strong traffic channel signal.

19. The apparatus of claim 13 wherein said accumulation occurs over an interval of length $L/2^n$, where L is the length of Walsh functions used, a pilot signal is transferred over a first channel and relatively strong signals are preferentially transferred on channels that are spaced apart from the first channel by increments of $sL/2^n$, where n is a positive integer and s equals 1 through $2^n-1$.

20. The apparatus of claim 19 wherein said Walsh functions have a length of 128 chips and a pilot signal is transferred over channel 0 while traffic is transferred over channels 32, 64, and 96.

21. The apparatus of claim 19 wherein said Walsh functions have a length of 128 chips and a pilot signal is transferred over channel 1 while traffic is transferred over channels 33, 65, and 97.

22. The apparatus of claim 19 wherein said strong signals comprise a paging signal.

23. The apparatus of claim 19 wherein said strong signals comprise a synchronization signal.

* * * * *